United States Patent
Lautrup et al.

(10) Patent No.: US 12,030,603 B2
(45) Date of Patent: Jul. 9, 2024

(54) MODULAR UNDERWATER VEHICLE

(71) Applicants: Robert W. Lautrup, Oakton, VA (US); Anthony C. Mulligan, Sahuarita, AZ (US)

(72) Inventors: Robert W. Lautrup, Oakton, VA (US); Anthony C. Mulligan, Sahuarita, AZ (US)

(*) Notice: Subject to any disclaimer, the term of this patent is extended or adjusted under 35 U.S.C. 154(b) by 0 days.

(21) Appl. No.: 16/858,446

(22) Filed: Apr. 24, 2020

(65) Prior Publication Data
US 2021/0331774 A1    Oct. 28, 2021

(51) Int. Cl.
| | | |
|---|---|---|
| B63G 8/04 | (2006.01) | |
| B63G 8/00 | (2006.01) | |
| B63G 8/08 | (2006.01) | |
| B63G 8/28 | (2006.01) | |
| G01C 21/16 | (2006.01) | |
| G01S 15/93 | (2020.01) | |
| G01S 19/01 | (2010.01) | |
| G01S 19/42 | (2010.01) | |

(52) U.S. Cl.
CPC ............... *B63G 8/04* (2013.01); *B63G 8/001* (2013.01); *B63G 8/08* (2013.01); *B63G 8/28* (2013.01); *G01C 21/16* (2013.01); *G01S 15/93* (2013.01); *G01S 19/015* (2013.01); *G01S 19/42* (2013.01); *B63G 2008/004* (2013.01)

(58) Field of Classification Search
CPC . B63G 8/08; B63G 8/04; B63G 8/001; B63G 8/28; B63G 2008/004; G01C 21/16; G01S 15/93; G01S 19/015; G01S 19/42
See application file for complete search history.

(56) References Cited

U.S. PATENT DOCUMENTS 2,572,116 A    10/1951  Daly
3,157,145 A  * 11/1964  Farris ................... B63G 8/24
                                                    244/46
(Continued)

FOREIGN PATENT DOCUMENTS

CN     104571130 A    4/2015
CN     109334992 A    2/2019
(Continued)

OTHER PUBLICATIONS

International Search Report for corresponding International Patent Application No. PCT/US2021/028938, filed Apr. 23, 2021, International Search Report mailed Jul. 21, 2021 (2 pgs.).

(Continued)

*Primary Examiner* — Andrew Polay
(74) *Attorney, Agent, or Firm* — Lewis Roca Rothgerber Christie LLP

(57) ABSTRACT

A modular underwater vehicle includes a hull having a series of modular sections, defining an interior housing, a propulsor coupled to a stern of the hull, a series of control surfaces coupled to the propulsor or the stern of the hull, and a power supply, a processor, and a nonvolatile memory device in the interior housing. The nonvolatile memory device has instructions stored therein which, when executed by the processor, cause the processor to supply power from the power supply to drive the propulsor and to actuate the plurality of control surfaces. At least one modular section of the series of modular sections is detachable.

25 Claims, 9 Drawing Sheets

(56) References Cited

U.S. PATENT DOCUMENTS

| | | | | |
|---|---|---|---|---|
| 3,864,772 | A | * | 2/1975 | Gogolick ................ B63G 8/24 |
| | | | | 114/331 |
| 4,271,552 | A | * | 6/1981 | Sandler .................. F42B 19/44 |
| | | | | 114/54 |
| 4,648,322 | A | * | 3/1987 | Heitz ..................... F42B 19/06 |
| | | | | 102/411 |
| 5,235,930 | A | | 8/1993 | Pendleton |
| 5,668,777 | A | | 9/1997 | Schneider |
| 5,944,762 | A | | 8/1999 | Bessacini et al. |
| 5,995,882 | A | | 11/1999 | Patterson et al. |
| 6,118,066 | A | * | 9/2000 | Sirmalis .................. B63C 11/42 |
| | | | | 114/20.1 |
| 6,634,825 | B2 | | 10/2003 | Tolkoff et al. |
| 6,671,229 | B2 | | 12/2003 | Schmidt |
| 7,013,827 | B2 | | 3/2006 | Harland-White |
| 7,032,858 | B2 | | 4/2006 | Williams |
| 7,613,553 | B1 | | 11/2009 | Benjamin |
| 7,631,833 | B1 | | 12/2009 | Ghaleb et al. |
| 8,205,570 | B1 | | 6/2012 | Tureaud et al. |
| 8,539,898 | B1 | * | 9/2013 | Sylvia ..................... B63G 8/18 |
| | | | | 114/312 |
| 8,677,920 | B1 | * | 3/2014 | Jeng ........................ B63G 8/38 |
| | | | | 114/77 R |
| 8,880,275 | B1 | | 11/2014 | Del Savio et al. |
| 9,873,494 | B2 | | 1/2018 | Jewell |
| 9,933,240 | B2 | | 4/2018 | Cipolla et al. |
| 2002/0152947 | A1 | * | 10/2002 | Hilleman ................. B63H 5/14 |
| | | | | 114/338 |
| 2008/0041294 | A1 | | 2/2008 | Diorio et al. |
| 2008/0059338 | A1 | * | 3/2008 | Hubbard .............. G06Q 10/087 |
| | | | | 705/28 |
| 2010/0279559 | A1 | * | 11/2010 | Yoshikawa .............. B63H 5/14 |
| | | | | 440/6 |
| 2012/0037059 | A1 | | 2/2012 | Brenner |
| 2012/0137949 | A1 | | 6/2012 | Vosburgh |
| 2014/0213126 | A1 | * | 7/2014 | Item ........................ B63C 11/42 |
| | | | | 114/337 |
| 2015/0000584 | A1 | * | 1/2015 | Sancoff .................... B63B 1/14 |
| | | | | 114/312 |
| 2017/0074664 | A1 | | 3/2017 | Cheramie |
| 2018/0251199 | A1 | * | 9/2018 | Radford .................. B25J 11/00 |
| 2019/0049967 | A1 | | 2/2019 | Lim et al. |
| 2019/0056200 | A1 | | 2/2019 | Teetzel et al. |

FOREIGN PATENT DOCUMENTS

| | | |
|---|---|---|
| EP | 1360108 B1 | 3/2008 |
| FR | 3001287 A1 | 7/2014 |
| RU | 2667674 C1 | 9/2018 |
| WO | 02/064423 A1 | 8/2002 |
| WO | 03059734 A1 | 7/2003 |
| WO | WO-2021044119 A1 * | 3/2021 ............. F42B 30/08 |

OTHER PUBLICATIONS

Written Opinion of the International Searching Authority for corresponding International Patent Application No. PCT/US2021/028938, filed Apr. 23, 2021, Written Opinion mailed Jul. 21, 2021 (7 pgs.).

European Search Report dated Apr. 23, 2024, issued in European Patent Application No. 21792784.7 (9 pages).

* cited by examiner

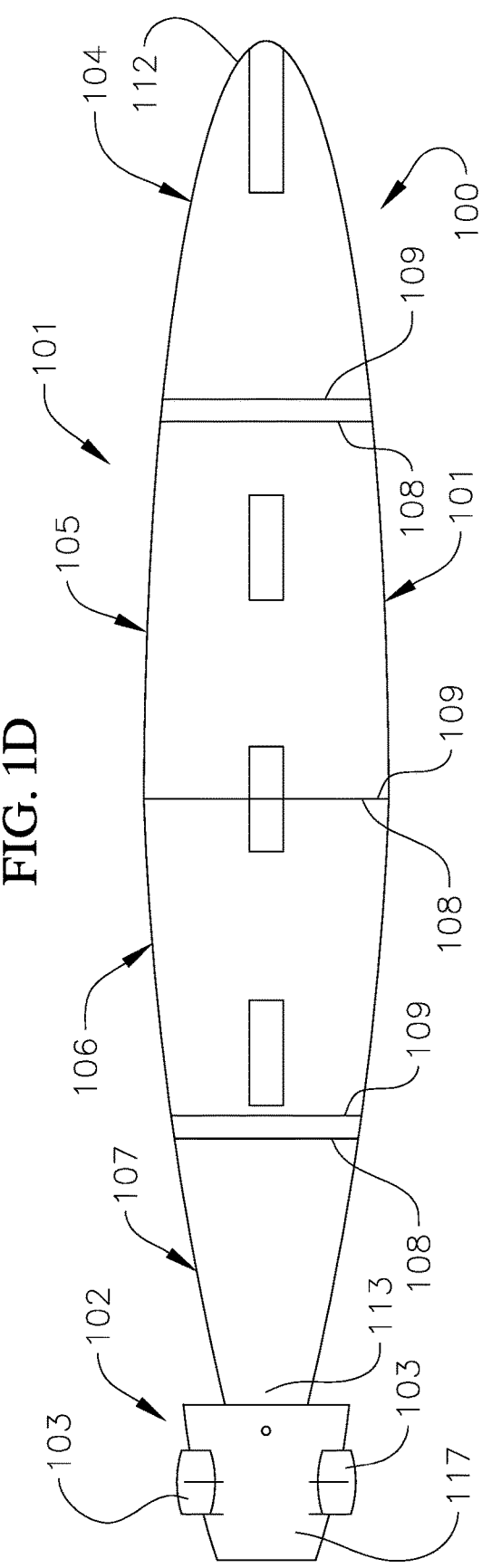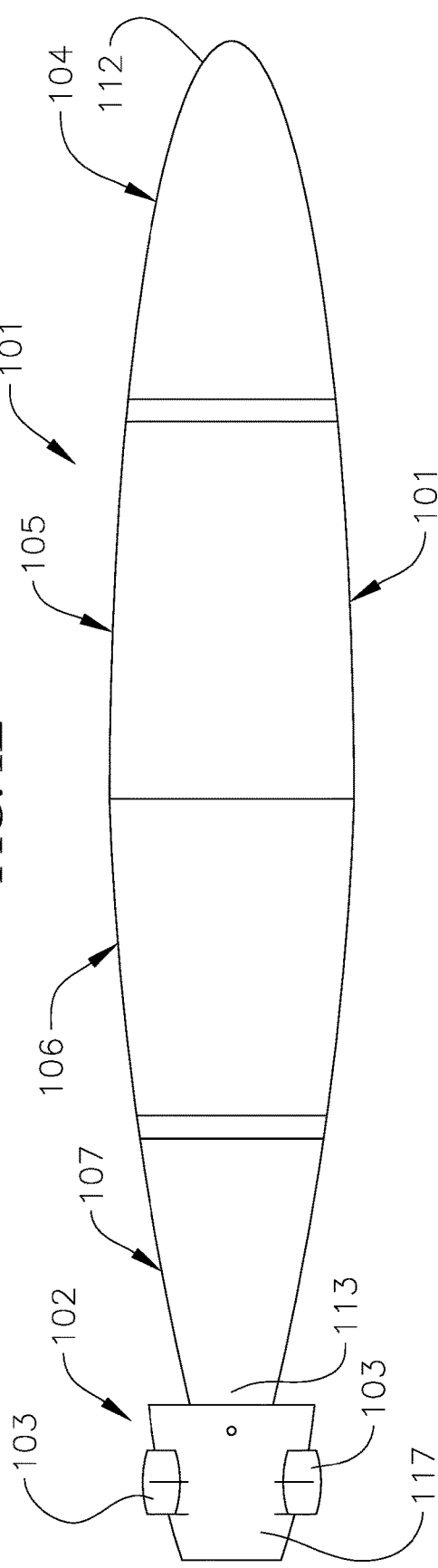

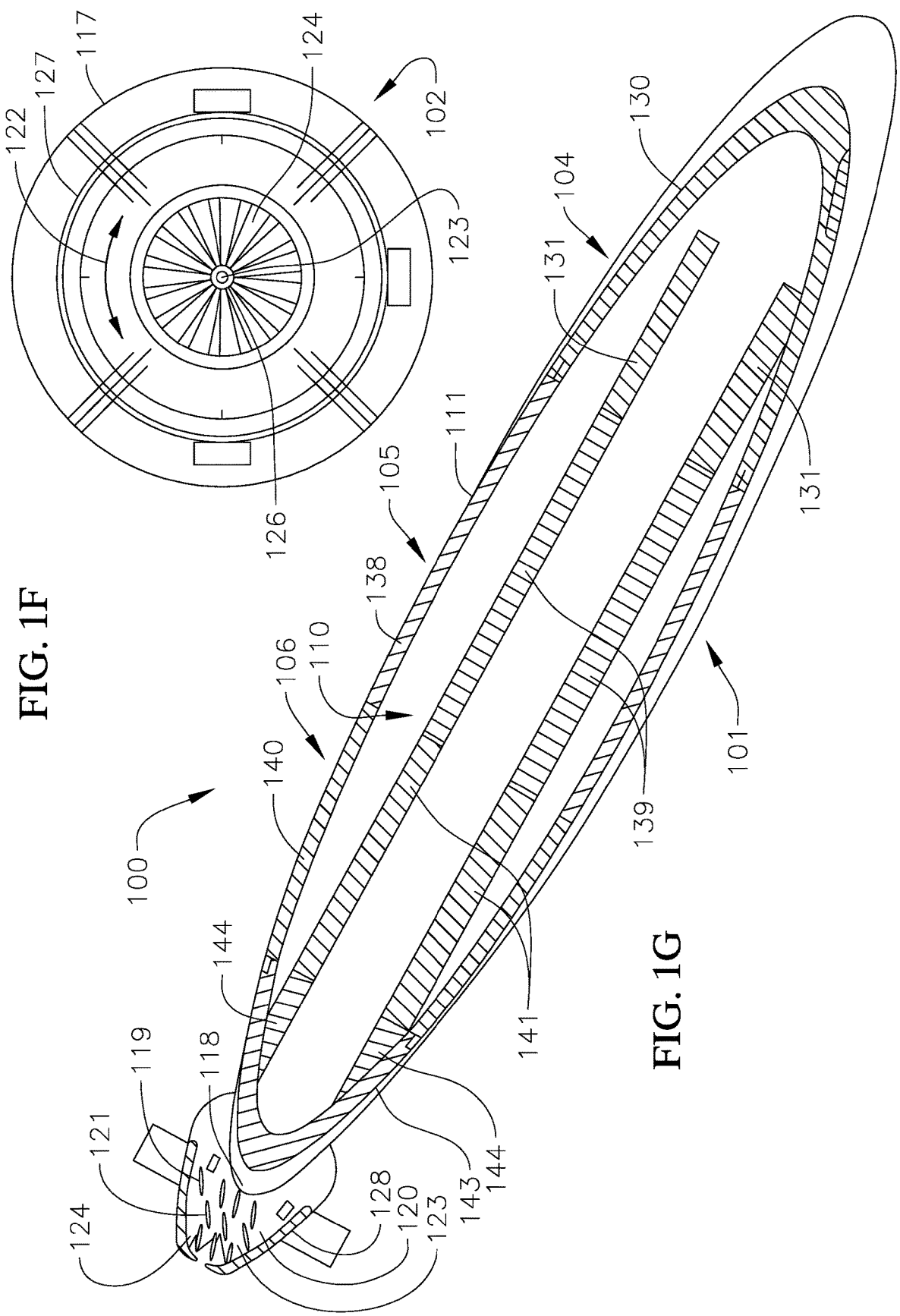

MODULAR UNDERWATER VEHICLE

BACKGROUND

1. Field

Aspects of the present disclosure relate generally to a modular underwater vehicle having one or more replaceable modules configured to reconfigure the vehicle.

2. Description of the Related Art

Conventional torpedoes typically include a tubular body having a rounded front end and a cylindrical portion extending over a substantial length of the tubular body. Additionally, conventional torpedoes typically include control surfaces to control attitude and course of the torpedo that are mounted horizontally and vertically. Conventional torpedoes also typically include either single or double mechanically driven propellers coupled to an aft end of the tubular body. However, the cylindrical portion of the tubular body results in high drag, which limits the range and speed of the torpedo. Moreover, the mechanically driven control surfaces and/or the mechanically driven propellers generate mechanical noise and the tubular body includes penetrations, such as mechanical bearings for actuators and/or rotating shafts, which may permit seawater to enter the interior of tubular body and thereby damage electric components housed in the interior of the torpedo.

Moreover, conventional torpedoes are not intelligent, do not receive or transmit their geographic position, and do not search for a target. Instead, conventional torpedoes are launched on a preset course to intercept a known target. Some conventional torpedoes utilize a guidance wire that permits the launch submarine to alter the course of the torpedo, but such guidance wires are subject to breaking. Accordingly, the probability of kill (Pk) of conventional torpedoes against submarines in the complex littoral environment (i.e., adjacent to a land mass and within the 100-fathom curve, rather than the open ocean), which includes shore and shipping traffic noise, bottom and surface acoustic reflection and acoustic layers, is extremely low.

Furthermore, conventional torpedoes are 20 feet in length and 21 inches in diameter, and therefore only one of these conventional torpedoes can fit in a submarine storage position or torpedo tube, which limits the overall capacity of the submarine or other vessel carrying these conventional torpedoes. In addition, conventional torpedoes require proofing runs on a range and cannot be tested and checked out electronically (i.e., conventional torpedoes cannot be certified electronically), which increases the cost of conventional torpedoes.

SUMMARY

The present disclosure relates to various embodiments of a modular underwater vehicle. In one embodiment, the modular underwater vehicle includes a hull having a series of modular sections defining an interior housing, a propulsor coupled to a stern of the hull, a series of control surfaces coupled to the propulsor or the stern of the hull, and a power supply, a processor, and a nonvolatile memory device in the interior housing. The nonvolatile memory device has instructions stored therein which, when executed by the processor, cause the processor to supply power from the power supply to drive the propulsor and to actuate the plurality of control surfaces. At least one modular section of the series of modular sections is detachable.

The series of control surfaces may be arranged in an X-tail configuration.

Each of the series of control surfaces may be oriented at approximately 45 degrees relative to a vertical axis or a horizontal axis of the modular underwater vehicle.

Each of the series of control surfaces may be configured to be independently directly actuated.

A bow portion of the hull may have an ellipsoidal shape and a stern portion of the hull may have a paraboloidal shape.

A cross-sectional shape of the hull may vary continuously across an entire length of the hull.

The propulsor may be a three-stage propulsor.

The three-stage propulsor may be a first stage stator, a second stage rotor, and a third stage stator.

The propulsor may further include a permanent magnet motor configured to drive the second stage rotor.

The modular underwater vehicle may include a fairing surrounding the three-stage propulsor.

A stator of the permanent magnet motor may be in the fairing, and a rotor of the permanent magnet motor may be in the second stage rotor.

The hull may include an anechoic material.

A length of the hull may be approximately 10 feet or less, and a maximum width of the hull may be approximately 19 inches or less. A length of the hull may be approximately 20 feet or less, and a maximum width of the hull may be approximately 21 inches or less.

At least one module of the series of modules may be selectable from a warhead module configured to search for, target and attack a vessel, an exercise module, a target simulator module configured to emit a sound imitating an acoustic signature of a target vessel, and decoy module configured to emit a sound imitating an acoustic signature of a launch vessel.

When the at least one module is the warhead module, the modular underwater vehicle may be neutrally buoyant in seawater.

When the at least one module is the exercise module or the target simulator module, the modular underwater vehicle may be initially neutrally buoyant in seawater and positively buoyant in seawater at end-of-run.

When the at least one module is the decoy module, the modular underwater vehicle may be initially neutrally buoyant in seawater and negatively buoyant in seawater at end-of-run.

The warhead module may include a navigation system configured to enable autonomous tracking of a target submarine.

The navigation system may include at least one sonar, an inertia measurement unit (IMU), a Global Positioning System (GPS) receiver including a Selective Availability Anti-Spoofing Module (SAASM), and an artificial neural network trained to classify objects in a maritime environment.

The modular underwater vehicle may also include a waterproof electrical connector in the hull configured to enable electronic checkout of the modular underwater vehicle.

The present disclosure is also directed to various embodiments of a modular underwater vehicle system. In one embodiment, the modular underwater vehicle system includes a modular underwater vehicle and a series of modules. In one embodiment, the modular underwater vehicle includes a hull having a series of modular sections defining an interior housing, a propulsor coupled to a stern of the hull, a series of control surfaces coupled to the propulsor or the stern of the hull, and a power supply, a processor, and nonvolatile memory device in the interior housing. The nonvolatile memory device has instructions stored therein which, when executed by the processor, cause the processor to supply power from the power supply to drive the propulsor and to actuate the plurality of control surfaces. The system also includes a warhead module configured to be installed as one of the series of modular sections of the hull. The warhead modular is configured to enable the modular underwater vehicle to target and attack a vessel. The system also includes a exercise module configured to be installed as one of the series of modular sections of the hull. The exercise module is configured to enable the modular underwater vehicle to perform tests. The system further includes a target simulator module configured to be installed as one of the series of modular sections of the hull. The target simulator module is configured to emit sound imitating an acoustic signature of a target vessel. The system also includes a decoy module configured to be installed as one of the series of modular sections of the hull. The decoy module is configured to emit a sound imitating an acoustic signature of a launch vessel.

The warhead module may include an insensitive high explosive shaped-charge warhead, and a navigation system configured to enable autonomous tracking of a target submarine. The navigation system may include at least one sonar, an inertia measurement unit (IMU), a Global Positioning System (GPS) receiver including a Selective Availability Anti-Spoofing Module (SAASM), and an artificial neural network trained to classify objects in a maritime environment.

When the warhead module is installed on the modular underwater vehicle, the modular underwater vehicle may be neutrally buoyant in seawater.

The exercise module may include a data recorder configured to record vehicle data and a simulated warhead detonation, and a location pinger and/or a visual beacon.

The target simulator module may include at least one acoustic device, a processor, a nonvolatile memory device, and a location pinger and/or a visual beacon. The nonvolatile memory device may include instructions stored therein which, when executed by the processor, cause the at least one acoustic device to emit the sound imitating the acoustic signature of the target vessel.

The decoy module may include at least one acoustic device, a processor, and a nonvolatile memory device. The nonvolatile memory device may include instructions stored therein which, when executed by the processor, cause the at least one acoustic device to emit the sound imitating the acoustic signature of the launch vessel.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIGS. 1A-1G are a front perspective view, a first rear perspective view, a second rear perspective view, a side view, a top view, a rear view, and a longitudinal cross-sectional view, respectively, of a modular underwater vehicle according to one embodiment of the present disclosure;

DETAILED DESCRIPTION

Figure 1A:
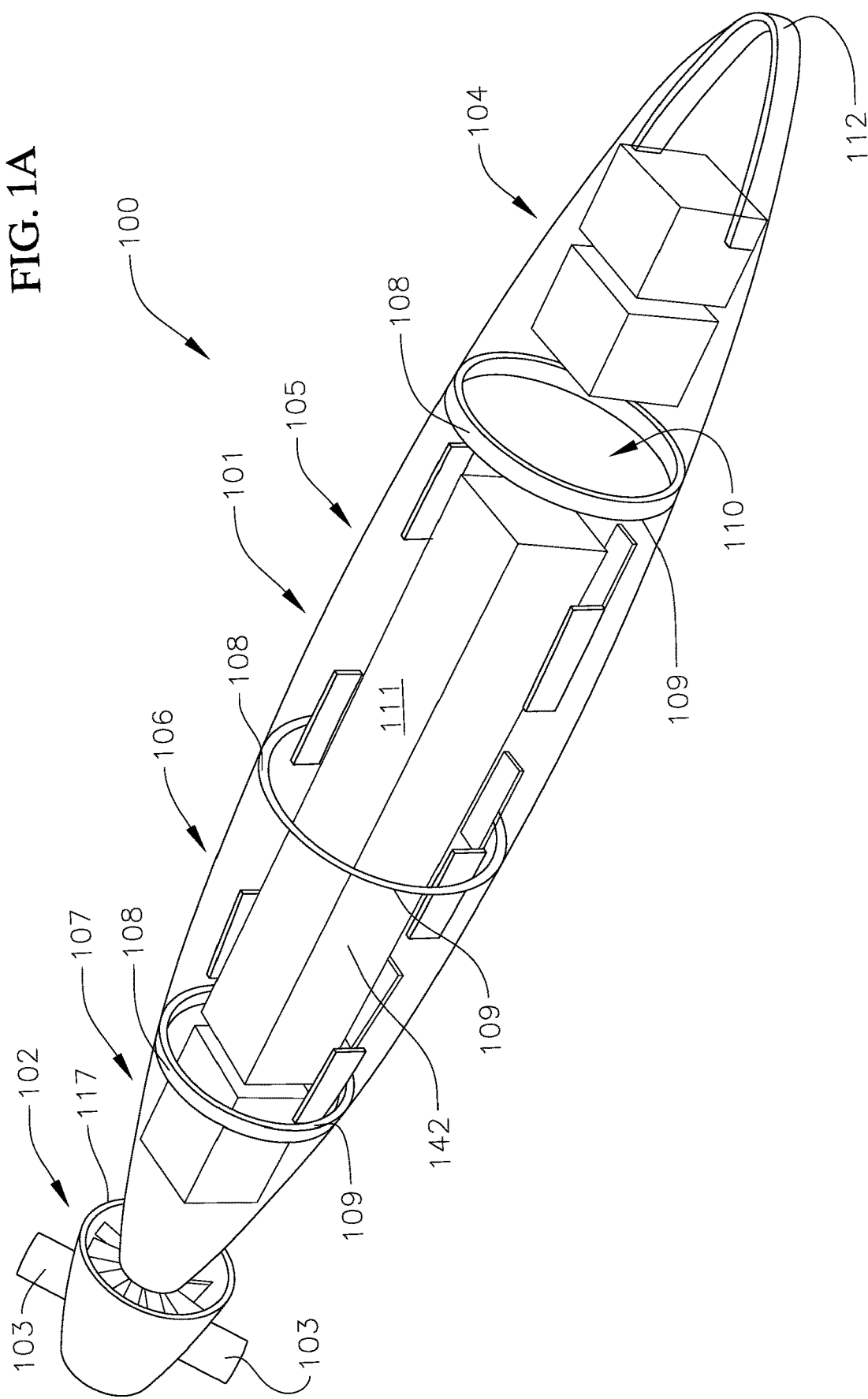

The present disclosure relates to various embodiments of a modular underwater vehicle. According to one or more embodiments, the modular underwater vehicle has a hull including one or more sections or modules that may be removed and replaced with another module or section that provides the modular underwater vehicle with different functionality. For instance, in one or more embodiments, one or more of the modules or sections of the hull may be removed and replaced with a warhead module, an exercise torpedo module, a submarine target module, or a decoy module. When the warhead module is installed, the modular underwater vehicle is configured to function as a warhead, varying course, speed, and depth to intelligently (e.g., via a trained artificial neural network) search for, target, and attack an enemy ship or submarine. When the exercise torpedo module is installed, the modular underwater vehicle is configured to record various vehicle data (e.g., location and speed) and a simulated warhead detonation during an exercise, and guide the modular underwater vehicle to the surface of the water and activate a location pinger after completion of the exercise (i.e., at end-of-run). When the target module is installed, the modular underwater vehicle is configured to simulate a target submarine by following a preprogrammed path, depth, and speed, and emitting a sound emulating an acoustic signature of a target submarine. When the decoy module is installed, the modular underwater vehicle is configured to follow a preprogrammed path, depth, and speed, and to emit the launching vehicle's (e.g., the launch submarine's) acoustic signature to aid the evasion and escape of the launching vehicle. In one or more embodiments, the modular underwater vehicle may be reconfigurable (e.g., by replacing one of the modules of the hull) at fleet facilities, rather than requiring a return to depot.

With reference now to FIGS. 1A-1G a modular underwater vehicle 100 according to one embodiment of the present disclosure includes a hull 101, a propulsor 102 coupled to an aft end portion (i.e., the stern) of the hull 101 configured to propel the modular underwater vehicle 100, and a series of control surfaces (e.g., fins) 103 coupled to the aft end portion (i.e., the stern) of the hull 101 configured to navigate the modular underwater vehicle 100 through the water. The modular underwater vehicle 100 of the present disclosure may be launched by any suitable type or kind of vehicle, such as manned or unmanned fixed-wing aircraft or rotary aircraft (e.g., an unmanned aerial vehicle (UAV)), manned or unmanned surface craft (e.g., rigid inflatable vehicles, tactical special operations vehicles, littoral combat vessels, or larger combatant ships such as destroyers, cruisers, aircraft carriers, or amphibious combat and support ships), ultra-large unmanned surface vehicles (ULUSV), nuclear or non-nuclear powered submarines, or autonomous large unmanned underwater vehicles (ULUUV).

The hull 101 includes a series of removable sections or modules. In the illustrated embodiment, the hull 101 includes four modules (i.e., a first, forwardmost module 104; a second, intermediate module 105 detachably coupled to an aft end of the first module 104; a third, intermediate module 106 detachably coupled to an aft end of the second module 105; and a fourth, aft-most module 107 detachably coupled to an aft end of the third module 106). In one or more embodiments, the hull 101 may include any other suitable number of detachable modules, such as, for instance, from two detachable modules to six detachable modules. Additionally, in one or more embodiments, each of the modules 104-107 may have the same or substantially the same lengths, or two or more of the modules 104-107 may have different lengths, depending, for instance, on the components housed in each of the modules 104-107. The modules 104-107 may be detachably connected to each other with any suitable mechanism or mechanisms, such as with interlocking connectors 108 (e.g., a bayonet mount, threads, partial rotation locking joints, or other positive locking joints) and gaskets 109 (e.g., O-rings) to form a watertight seal against the intrusion of seawater into an interior 110 of the hull 101. As described in more detail below, one or more of the modules 104-107 may be removed and replaced with one or more different modules to reconfigure the modular underwater vehicle 100 to have different and/or additional capabilities. Although in one or more embodiments an entire module may be removed and replaced by a different module to reconfigure the modular underwater vehicle 100, in one or more embodiments, a module may be removed and one or more of the electronic components housed therein may be removed and replaced with a different electronic component to reconfigure the modular underwater vehicle 100. Moreover, although in the illustrated embodiment each of the modules 104-107 are removable, in one or more embodiments, fewer than all of the modules 104-107 may be removable. For instance, in one or more embodiments, only one or two of the modules 104-107 may be removable.

In one or more embodiments, an outer surface 111 of the hull 101 may include an anechoic coating. The anechoic coating is configured to absorb sound waves (and thereby reduce the emission of sounds from the modular underwater vehicle 100) and to reduce the reflection of sonar signals off of the hull (and thereby mitigate against detection of the modular underwater vehicle 100). Accordingly, the anechoic coating is configured to reduce the detectability of the modular underwater vehicle 100 compared to an otherwise comparable underwater vehicle without the anechoic coating. In one or more embodiments, the hull 101 may be formed of an anechoic material instead of, or in addition to, the anechoic coating on the outer surface 111 of the hull 101. In one or more embodiments, the hull 101 may be formed of a composite polymer material having sufficient strength for the function of the modular underwater vehicle 100, including withstanding a high-g launch and operating at a nominal depth of approximately 600 feet or greater. Moreover, in one or more embodiments, the hull 101 may be additively manufactured by any suitable additive manufacture process or processes.

With continued reference to the embodiment illustrated in FIGS. 1A-1G, the transverse cross-sectional shape of the hull 101 has a continuously changing diameter along the length of the hull 101. Additionally, in the illustrated embodiment, the bow 112 of the hull 101 has an ellipsoidal or generally ellipsoidal shape and the stern 113 of the hull 101 has a paraboloidal or generally paraboloidal shape. The ellipsoidal and paraboloidal shape of the hull 101 is configured to reduce the drag of the hull 101, and thereby increase the range and speed of the modular underwater vehicle 100 compared to conventional torpedoes that have a cylindrical shape along a substantial length of the hull. In one or more embodiments, the overall length L (measured from a forwardmost part of the bow 112 to a aftmost part of the stern 113) of the hull 101 is 10 feet (or approximately 10 feet) or less and the maximum width W (e.g., diameter) of the hull 101 is 19 inches (or approximately 19 inches) or less, which together enable the modular underwater vehicle 100 to be double-stored in submarine racks (i.e., each submarine rack can accommodate two modular underwater vehicles 100 rather than a single conventional torpedo) and enable the modular underwater vehicle 100 to fit into existing surface ship and aircraft launchers. In one or more embodiments, the overall length L of the hull 101 is 20 feet (or approximately 20 feet) or less and the maximum width W (e.g., diameter) of the hull 101 is 21 inches (or approximately 21 inches) or less. In one or more embodiments, the ratio of the length L of the hull 101 to the maximum width W (e.g., maximum diameter) of the hull 101 is 7.72 (or approximately 7.72). Accordingly, in one or more embodiments in which the hull 101 has a length L of 10 feet (120 inches) and a ratio of length to maximum width of 7.72, the hull 101 has a maximum width W (e.g., a maximum diameter) of 15.54 inches. In one or more embodiments, the ratio of the length L of the hull 101 to the maximum width W (e.g., the maximum diameter) of the hull 101 may be in a range from approximately 6 to approximately 8.5.

In the illustrated embodiment, the propulsor 102 is a three-stage propulsor including a first stage stator 114 (i.e., a forward stationary stator), a second stage rotor 115 downstream of the first stage stator 114, and a third stage stator 116 (i.e., an aft stationary stator) downstream of the second stage rotor 115. In the illustrated embodiment, the propulsor 102 also includes a fairing 117 circumferentially surrounding (i.e., shrouding) the first stage stator 114, the second stage rotor 115, and the third stage stator 116. In the illustrated embodiment, the first stage stator 114 includes a hub 118 and a series of blades 119 circumferentially arranged around the hub 118 and extending radially outward from the hub 118. The hub 118 and the blades 119 of the first stage stator 114 are stationary (i.e., fixed relative to the hull 101) and configured to guide and orient the incoming water flow to the second stage rotor 115. The second stage rotor 115 includes a hub 120 and a series of blades 121 circumferentially arranged around the hub 120 and extending radially outward from the hub 120. The hub 120 and the blades 121 of the second stage rotor 115 are configured to rotate (arrow 122) about an axial centerline of the hub 120 and thereby impart energy to the water flow passing through the first stage stator 114 and propel the modular underwater vehicle 100. In the illustrated embodiment, the third stage stator 116 includes a hub 123 and a series of blades 124 circumferentially arranged around the hub 123 and extending radially outward from the hub 123. The hub 123 and the blades 124 of the third stage stator 116 are stationary (i.e., fixed relative to the hull 101) and configured to straighten the water flow exiting the second stage rotor 115 (e.g., reduce turbulence and/or impart laminar flow to the water flow exiting the second stage rotor 115), which is configured to increase efficiency and reduce noise generation of the propulsor 102 compared to an otherwise comparable propulsor without the third stage stator 116.

In one or more embodiments, the rotation (arrow 122) of the second stage rotor 115 is driven by a permanent magnet motor (PMM) 125 integrated into the propulsor 102. In one or more embodiments, a rotor 126 of the PMM 125 is integrated into the second stage rotor 115 of the propulsor 102, and a stator 127 of the PMM 125 is integrated into the fairing 117. Integrating the PMM 125 into the propulsor 102, which is external to the hull 101, enables the propulsor 125 to be driven without penetrations (e.g., openings) in the hull 101 for mechanical components, such as a drive shaft, driving the second stage rotor 115 of the propulsor 102. Accordingly, in one or more embodiments, the hull 101 may include only electrical penetrations for one or more electrical wires driving the second stage rotor 115 of the propulsor 102 with the PMM 125, which is configured to eliminate mechanical noise associated with rotating shafts or other mechanical devices for driving the second stage rotor 115 of the propulsor 102 and mitigates against water intrusion into the interior 110 of the hull 101, which might otherwise occur with mechanical bearings and seals for mechanical components.

Figure 1B:
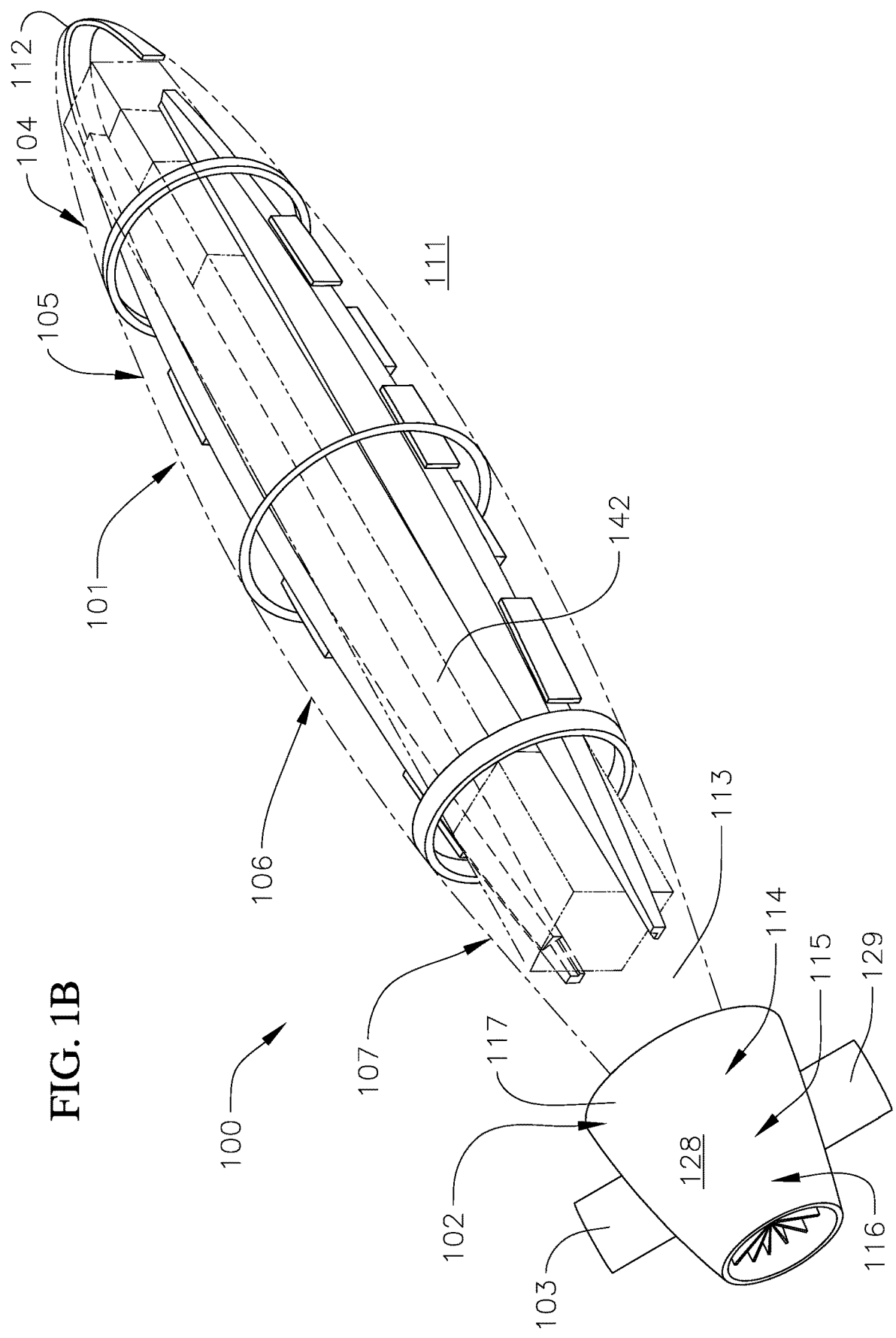
Figure 1C:
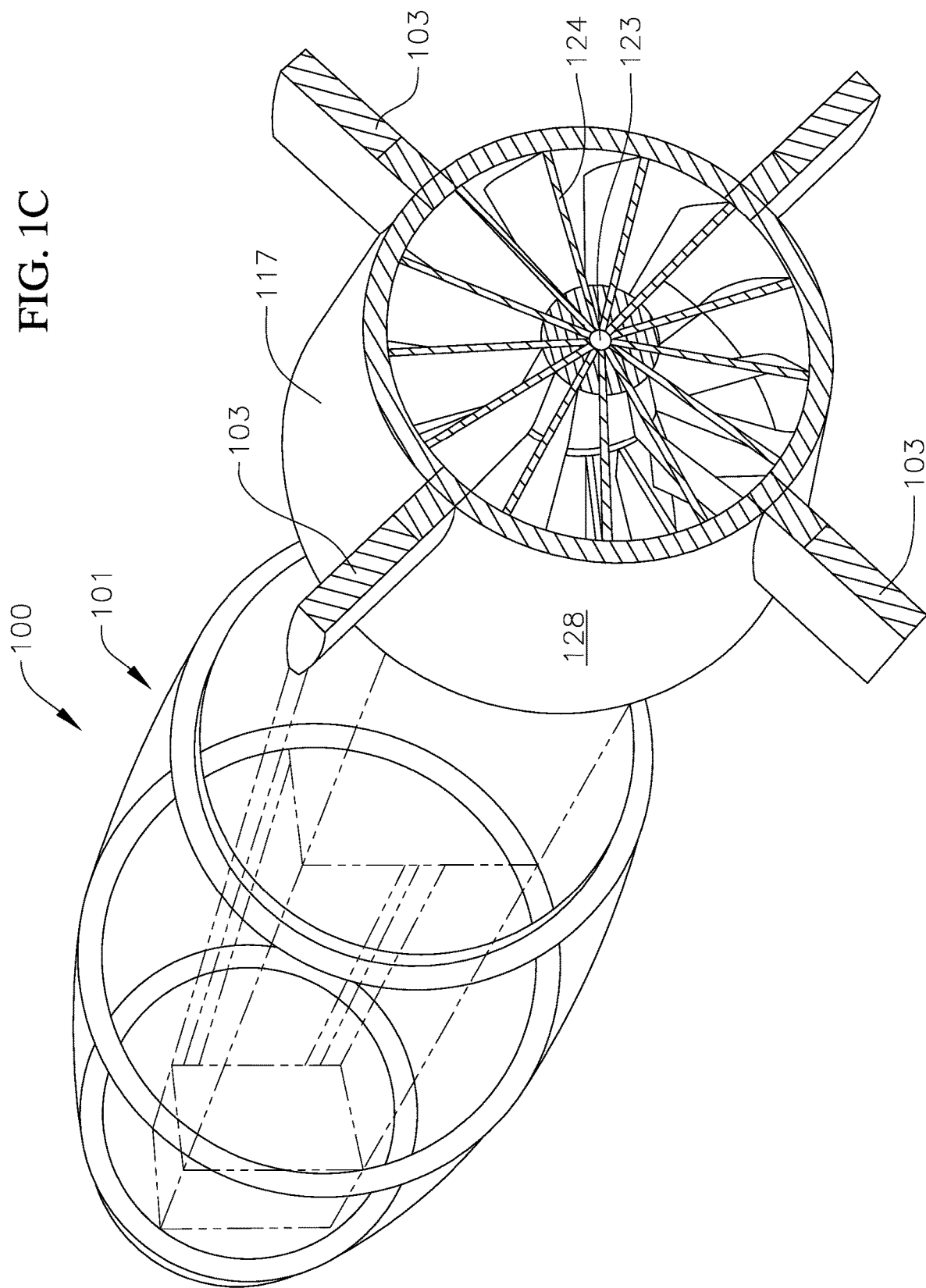

With continued reference to the embodiment illustrated in FIGS. 1A-1C the control surfaces 103 include four control surfaces arranged in an x-tail configuration. Additionally, in the illustrated embodiment, each of the four control surfaces 103 are oriented 45-degrees or approximately 45-degrees from both the vertical axis (e.g., the buttline) and the horizontal axis (e.g., the waterline) of the modular underwater vehicle 100. In the illustrated embodiment the control surfaces 103 are coupled to an outer surface 128 of the fairing 117 of the propulsor 102. In one or more embodiments, the control surfaces 103 may be coupled to the outer surface 111 of the hull 101 (e.g., the control surfaces 103 may be coupled to the stern 113 of the hull 101 having the paraboloidal shape, such as the fourth, aft-most module 107 of the hull 101). In one or more embodiments, the control surfaces 103 may be mounted on a stationary stabilizer. In one or more embodiments, the control surfaces 103 may be coupled to the fairing 117 or the hull 101 without a stationary stabilizer. Accordingly, the control surfaces 103 may include stationary portions or the control surfaces 103 may not include stationary portions.

Additionally, in one or more embodiments, the control surfaces 103 are driven by direct electrical actuators 129 in the control surfaces 103. In one or more embodiments, the four control surfaces 103 may be independently actuated by four direct electrical actuators 129. Integrating the direct electrical actuators 129 into the control surfaces 103, which are external to the hull 101, enables the control surfaces 103 to be actuated without penetrations (e.g., openings) in the hull for mechanical components, such as actuators, driving the control surfaces 103. Accordingly, in one or more embodiments, the hull 101 may include only electrical penetrations for driving the control surfaces 103, which is configured to eliminate mechanical noise associated with actuators or other mechanical devices for actuating the control surfaces 103 and mitigates against water intrusion into the interior 110 of the hull 101, which might otherwise occur with mechanical bearings and seals for mechanical components.

With continued reference to the embodiment illustrated in FIGS. 1A-1E and 1G, the forwardmost module 104 of the hull 101 includes an outer shell or skin 130, a series of rails 131 coupled to an interior surface of the skin 130, and various electronic components (described in detail below) coupled to the rails 131. In one or more embodiments, the rails 131 extend longitudinally along the forwardmost module 104. In the illustrated embodiment, the rails 131 includes upper and lower rails extending along the vertical axis (e.g., the buttline) and port and starboard rails extending along the horizontal axis (e.g., the waterline). In one or more embodiments, the forwardmost module 104 may have any other suitable number of rails 131 and the rails 131 may be arranged in any other suitable orientation.

Figure 2:
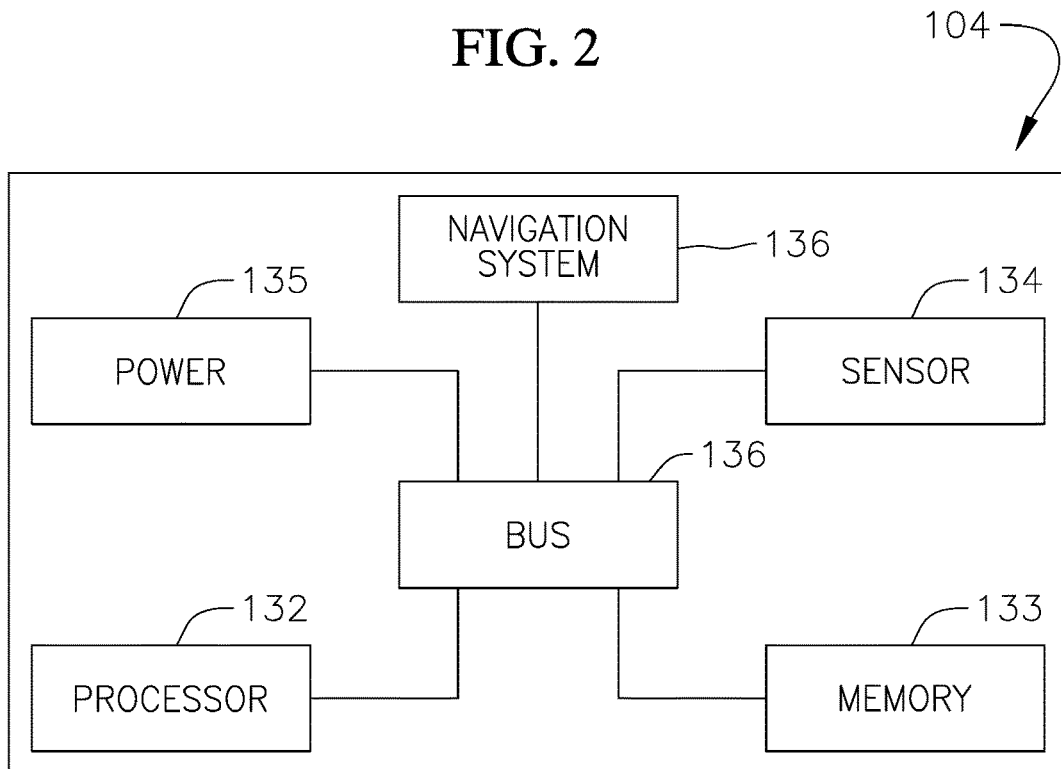
FIG. 2 is a schematic block diagram of a first module of a hull of the embodiment of the modular underwater vehicle illustrated in FIGS. 1A-1G according to one embodiment of the present disclosure.

FIG. 2 is a schematic block diagram of the first module 104 (i.e., the forwardmost module) according to one embodiment of the present disclosure. In the illustrated embodiment, the electronic components coupled to the rails 131 of the forwardmost module 104 include at least one processor 132 (e.g., a system-on-chip (SOC) architecture and/or a multi-core CPU), at least one nonvolatile memory device 133 (e.g., a solid-state storage device), at least one sensor 134, at least one power supply 135 (e.g., at least one battery) configured to supply power to the at least one sensor 134, and a system bus 136 over which the processor 132, the memory device 133, the power supply 135, and the at least one sensor 134 communicate with each other. In one or more embodiments, the at least one sensor 134 includes one or more sonars conformal with the skin 130 of the forwardmost module 104. In one or more embodiments, the sonars may include any suitable type or kind of sensors, such as active sonars, passive sonars, and/or synthetic aperture imaging sonars. In one or more embodiments, the at least one sensor 134 may include one or more hydrophones.

In one or more embodiments, the forwardmost module 104 includes a navigation system 137 configured to enable navigation of the modular underwater vehicle 100 (e.g., navigating the modular underwater vehicle 100 during a training exercise, during utilization as a decoy to enable evasion and escape, during targeting and attacking of an enemy vessel, and/or during a test exercise). In one or more embodiments, the navigation system 137 includes a series of inertial measurement units (IMUs) configured to measure and/or determine the specific force, angular rate, and/or orientation of the modular underwater vehicle 100. The IMUs may include accelerometers, gyroscopes (e.g., fiber optic gyroscopes (FOGs), ring laser gyroscopes (RLGs), and/or microelectromechanical systems (MEMS) gyroscopes), and/or magnetometers. In one or more embodiments, the navigation system 137 may include a Global Positioning System (GPS) receiver (e.g., one or more GPS antennae) having a Selective Availability Anti-Spoofing Module (SAASM) configured to decrypt precision GPS observations and thereby determine the position of the modular underwater vehicle 100 with high precision (e.g., military grade precision). In one or more embodiments, the one or more GPS antennae of the navigation system 137 are conformal with the outer skin 130 of the forwardmost module 104 of the hull 101. In one or more embodiments, the modular underwater vehicle 100 may broach the surface of the water to receive periodic GPS updates from the one or more GPS antennae and then submerge to the desired operating depth to continue its mission. In one or more embodiments, the one or more IMUs of the navigation system 137 are configured to navigate the modular underwater vehicle 100 with sufficient positional accuracy with only periodic positional updates via GPS. In one or more embodiments, the navigation system 137 may include a Kalman filter configured to generate estimates of the geographic position and/or the attitude of the modular underwater vehicle 137 with only periodic updates from the GPS. In one or more embodiments, the navigation system 137 may be provided in any other module of the hull 101, such as the third, intermediate module 106 or the fourth, aftmost module 107.

With continued reference to the embodiment illustrated in FIGS. 1A-1E and 1G the second, intermediate module 105 of the hull 101 includes an outer shell or skin 138, a series of rails 139 coupled to an interior surface of the skin 138, and various electronic components (described in detail below) coupled to the rails 139. In one or more embodiments, the rails 139 extend longitudinally along the intermediate module 105. In the illustrated embodiment, the rails 139 includes upper and lower rails extending along the vertical axis (e.g., the buttline) and port and starboard rails extending along the horizontal axis (e.g., the waterline). Accordingly, in the illustrated embodiment, the rails 139 in the second module 105 are aligned or substantially aligned with the rails 131 in the first module 104. In one or more embodiments, the second module 105 may have any other suitable number of rails 139 and the rails 139 may be arranged in any other suitable orientation.

In the illustrated embodiment, the second module 105 of the hull 101 may be removed (e.g., detached from the first and third modules 104 and 106) and replaced with another module housing one or more different components and/or additional components that are configured to equip the modular underwater vehicle 100 with different and/or additional functionality. As described in more detail below, the second module 105 of the hull 101 may be (i) a warhead module 200 configured to enable the modular underwater vehicle to target and attack a target vessel (e.g., a combatant ship or submarine), (ii) an exercise torpedo module 300 configured to enable the modular underwater vehicle 100 to perform various tests; (iii) a target simulator module 400 configured to enable the modular underwater vehicle 100 to simulate a submarine or other vessel during a training exercise; or (iv) a decoy module 500 configured to enable the modular underwater vehicle 100 to follow a preset path at a preset depth and speed and to match the acoustic signature of the launching vehicle and thereby aid the evasion and escape of the launching vehicle (e.g., the second module 105 of the hull 101 may be selected to have any one of four different configurations).

Figure 3:
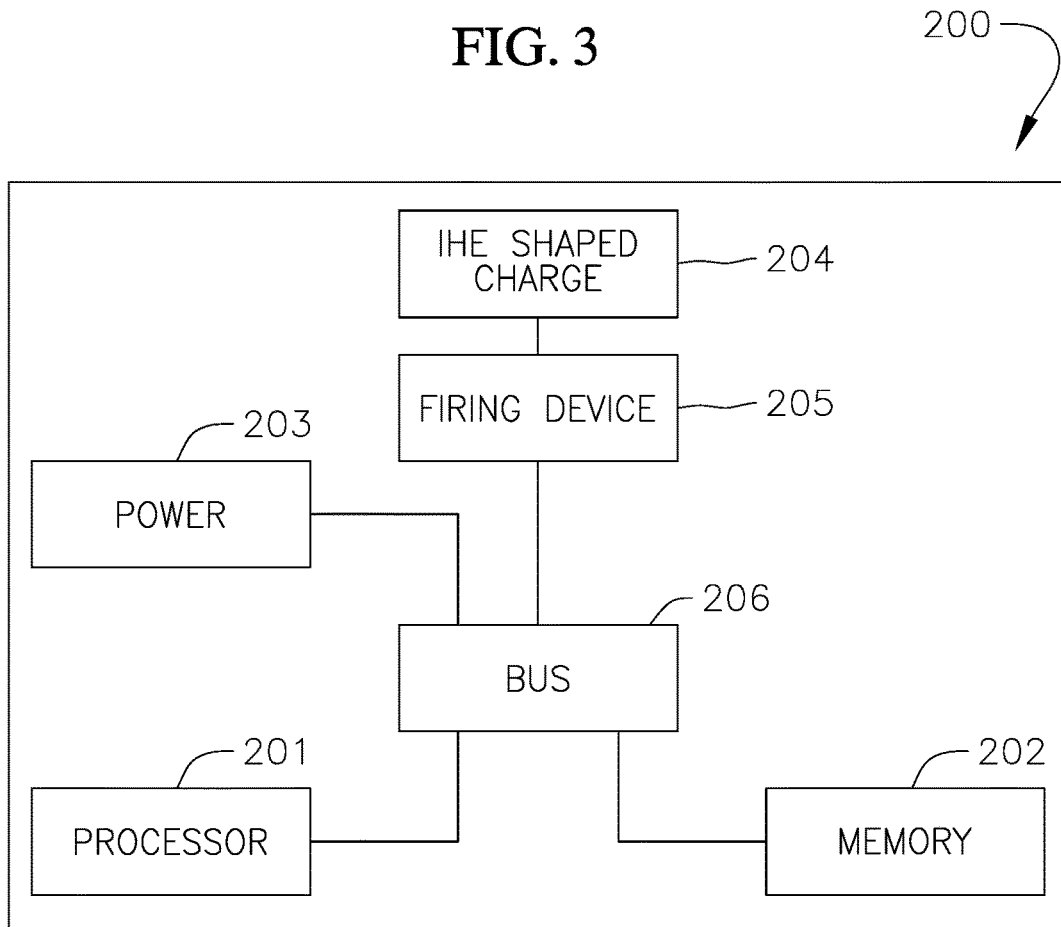
FIG. 3 is a schematic block diagram of a warhead module according to one embodiment of the present disclosure.

FIG. 3 is a schematic diagram of the warhead module 200 according to one embodiment of the present disclosure. In the illustrated embodiment, the warhead module 200 includes at least one processor 201 (e.g., a system-on-chip (SOC) architecture and/or a multi-core CPU), at least one nonvolatile memory device 202 (e.g., a solid-state storage device), at least one power supply 203 (e.g., at least one battery), an insensitive high explosive (IHE) shaped-charge warhead 204, at least one fusing, arming, and firing device 205 configured to arm and detonate the IHE shaped-charge warhead 204, and a system bus 206 over which the processor 201, the memory device 202, the power supply 203, the IHE shaped-charge warhead 204, and fusing, arming, and firing device 205 communicate with each other. In one or more embodiments, when the warhead module 200 is installed (e.g., as the second module 105 of the hull 101), the modular underwater vehicle 100 is neutrally buoyant in seawater.

In one or more embodiments, the IHE shaped-charge warhead 204 may be conformal with at least a portion of the outer skin 138. Additionally, in one or more embodiments, the IHE shaped-charge warhead 204 is additively manufactured. The IHE shaped-charge warhead 204 is configured to increase the safety of the modular underwater vehicle 100 throughout the life cycle of the modular underwater vehicle 100 (e.g., from the stockpile to target sequence). Additionally, the IHE shaped-charge warhead 204 is configured to enable target kill (e.g., destruction or disablement of a submarine) with reduced warhead weight, and therefore reduced overall weight of the modular underwater vehicle 100 compared to conventional torpedoes.

Additionally, in one or more embodiments, the memory device 202 of the warhead module 200 includes an artificial neural network trained to classify objects in a maritime environment (e.g., an artificial neural network configured to perform semantic segmentation of objects in a maritime environment, such as the littoral environment). In one or more embodiments, the artificial neural network may be trained by supervised or unsupervised learning. In one or more embodiments, the artificial neural network is trained to classify environmental objects and/or environmental conditions in an environmental scene as either a target vessel (e.g., a combatant ship or submarine) or not a target vessel (e.g., natural environmental objects, such as natural objects in the littoral environment). In one or more embodiments, the instructions stored in the memory device 202, when executed by the processor 201, cause the processor 201 to input environmental scene data (e.g., data captured by the one or more sonars and/or the one or more hydrophones in the first, forwardmost module 104) into an input layer of the artificial neural network, and receive an output from an output layer of the artificial neural network that results from the inference process performed by the artificial neural network. In one or more embodiments, if the artificial neural network inference process classifies one or more objects or conditions in the environmental scene data a target vessel (e.g., a combatant ship or submarine), the software instructions stored in the memory device 202, when executed by the processor 201, cause the modular underwater vehicle 100 to navigate toward the target vessel (e.g., by driving the second stage rotor 115 of the propulsor 102 and/or by actuating one or more of the control surfaces 103). In this manner, the modular underwater vehicle 100 equipped with the warhead module 200 is configured to identify (i.e., detect), track, and attack a target vessel utilizing the IHE shaped-charge warhead 204 (i.e., the modular underwater vehicle 100 equipped with the warhead module 200 is configured to intelligently, autonomously, and systematically search for, locate, identify through target recognition, and subsequently attack the target vessel).

Figure 4:
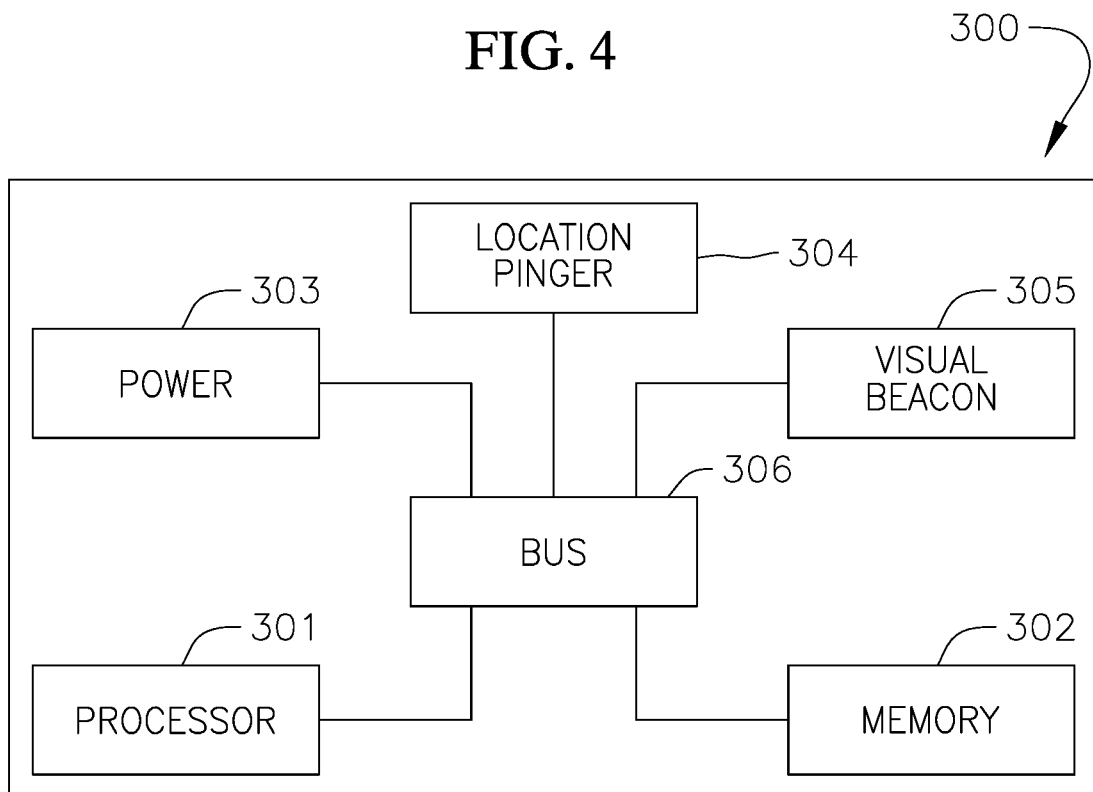
FIG. 4 is a schematic block diagram of an exercise module according to one embodiment of the present disclosure.

FIG. 4 is a schematic block diagram of the exercise torpedo module 300 according to one embodiment of the present disclosure. The exercise torpedo module 300 is configured to enable the modular underwater vehicle 100 to perform various test exercises. In the illustrated embodiment, the exercise torpedo module 300 includes at least one processor 301 (e.g., a system-on-chip (SOC) architecture and/or a multi-core CPU), at least one nonvolatile memory device 302 (e.g., a solid-state storage device), at least one power supply 303 (e.g., at least one battery), a location pinger 304, a visual beacon 305, and a system bus 306 over which the processor 301, the memory device 302, the power supply 303, the location pinger 304, and the visual beacon 305 communicate with each other.

In one or more embodiments, the location pinger 304 may include a transmitter antenna configured to transmit location data of the modular underwater vehicle 100. The transmitter antenna may be conformal with at least a portion of the outer skin 138 of the second module 105. In one or more embodiments, the visual beacon 305 may be one or more LED lights. Although in the illustrated embodiment the exercise torpedo module 300 includes both the location pinger 304 and the visual beacon 305, in one or more embodiments, the exercise torpedo module 300 may not include both the location pinger 304 and the visual beacon 305 (e.g., the exercise torpedo module 300 may include either the location pinger 304 or the visual beacon 305).

In one or more embodiments, the nonvolatile memory device 302 is a data recorder configured to record various vehicle data (e.g., location, speed, and depth of the modular underwater vehicle 100) and a simulated warhead detonation during an exercise of the modular underwater vehicle 100.

In one or more embodiments, when the exercise torpedo module 300 is installed (e.g., installed as the second module 105 of the hull 101), the modular underwater vehicle 100 is initially neutrally buoyant in seawater (i.e., neutrally buoyant in seawater at the beginning of the run) and the modular underwater vehicle 100 is positively buoyant in seawater at the end-of-run. Accordingly, when the exercise is complete, the modular underwater vehicle 100 is configured to return (e.g., float) to the surface of the water. Additionally, in one or more embodiments, the nonvolatile memory device 302 of the exercise torpedo module 300 includes instructions (e.g., software instructions) stored therein which, when executed by the processor 301, activate the location pinger 304 and/or activate the visual beacon 305 after completion of the exercise to enable range personnel to locate and recover the modular underwater vehicle 100 at the end of the exercise (e.g., at end-of-run when the modular underwater vehicle 100 floats to the surface).

Figure 5:
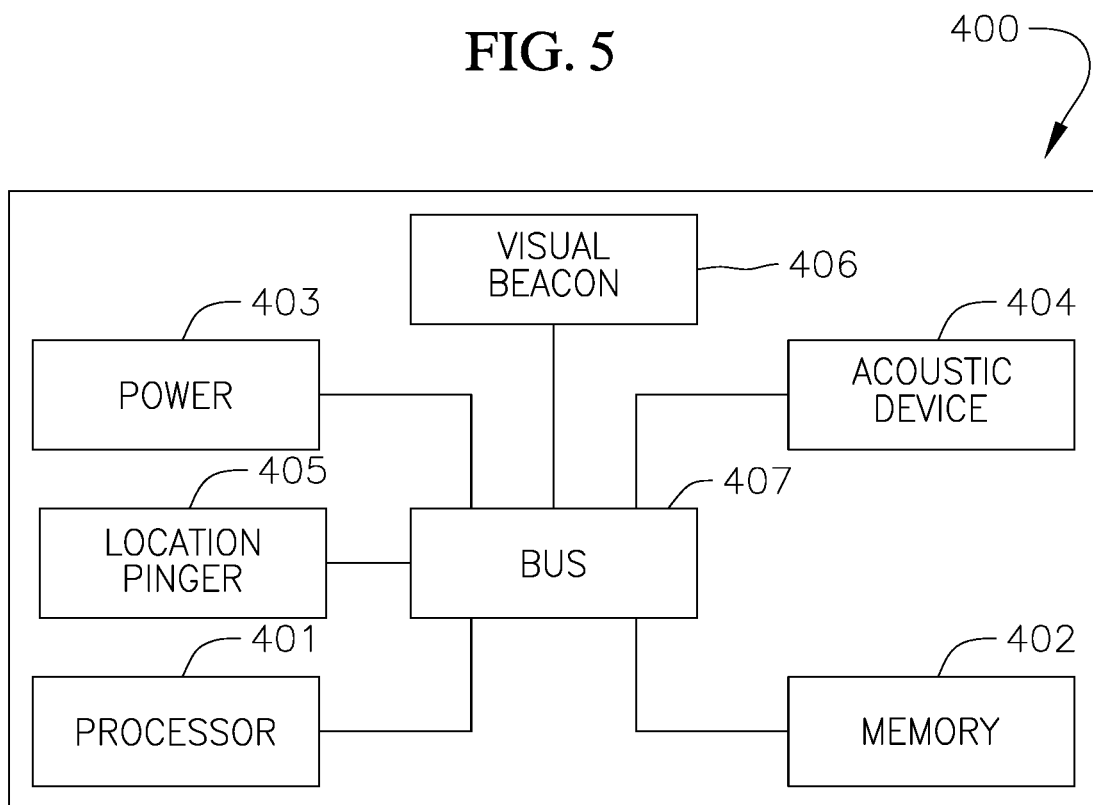
FIG. 5 is a schematic block diagram of a target module according to one embodiment of the present disclosure.

FIG. 5 is a schematic block diagram of the target simulator module 400 according to one embodiment of the present disclosure. The target simulator module 400 is configured to enable the modular underwater vehicle 100 to simulate a submarine or other vessel during a training exercise. In the illustrated embodiment, the target simulator module 400 includes at least one processor 401 (e.g., a system-on-chip (SOC) architecture and/or a multi-core CPU), at least one nonvolatile memory device 402 (e.g., a solid-state storage device), at least one power supply 403 (e.g., at least one battery), at least one acoustic device 404 (e.g., hydrophones mounted to the hull and/or a towed array of hydrophones), a location pinger 405, a visual beacon 406, and a system bus 407 over which the processor 401, the memory device 402, the power supply 403, the acoustic device 404, the location pinger 405, and visual beacon 406 communicate with each other.

In one or more embodiments, the location pinger 405 may include a transmitter antenna configured to transmit location data of the modular underwater vehicle 100. The transmitter antenna may be conformal with at least a portion of the outer skin 138 of the second module 105. In one or more embodiments, the visual beacon 406 may be one or more LED lights. Although in the illustrated embodiment the target simulator module 400 includes both the location pinger 405 and the visual beacon 406, in one or more embodiments, the target simulator module 400 may not include both the location pinger 405 and the visual beacon 406 (e.g., the target simulator module 400 may include either the location pinger 405 or the visual beacon 406).

In one or more embodiments, the nonvolatile memory device 402 has instructions stored therein which, when executed by the processor 401, cause the acoustic device 404 to emit sound matching or substantially matching the acoustic signature of a target vessel (e.g., sound matching or substantially matching the acoustic signature of a given target, such as a submarine, at a given speed and depth).

In the illustrated embodiment, the nonvolatile memory device 402 has instructions stored therein which, when executed by the processor 401, drive the second stage rotor 115 of the propulsor 102 and actuate one or more of the control surfaces 103 such that the modular underwater vehicle 100 follows a preset path at a preset depth and speed to simulate the path, depth, and speed of a target vessel (e.g., a target submarine). In one or more embodiments, the preset path, depth, and speed of the modular underwater vehicle 100 during the training exercise may be programmed into the nonvolatile memory device 402 by connecting to an external waterproof electrical connector 408 in the hull 101 (e.g., in the outer skin 138 of the second module 105) that is electrically coupled to the memory device 402.

In one or more embodiments, when the target simulator module 400 is installed (e.g., installed as the second module 105 of the hull 101), the modular underwater vehicle 100 is initially neutrally buoyant in seawater (i.e., neutrally buoyant in seawater at the beginning of the run) and the modular underwater vehicle 100 is positively buoyant at the end-of-run. Accordingly, when the exercise is complete, the modular underwater vehicle 100 is configured to return (e.g., float) to the surface of the water. Additionally, in one or more embodiments, the nonvolatile memory device 402 of the target simulator module 400 includes instructions (e.g., software instructions) stored therein which, when executed by the processor 401, activate the location pinger 405 and/or activate the visual beacon 406 after completion of the exercise to enable range personnel to locate and recover the modular underwater vehicle 100 at the end of the exercise (e.g., at end-of-run when the modular underwater vehicle 100 floats to the surface).

Accordingly, the target simulator module 400 enables a single vehicle (e.g., a submarine or an anti-submarine warfare (ASW) aircraft) to train on a range against a simulated submarine or other vessel without requiring an actual target submarine or other target vessel, which reduces the costs associated with conducting a training exercise.

Figure 6:
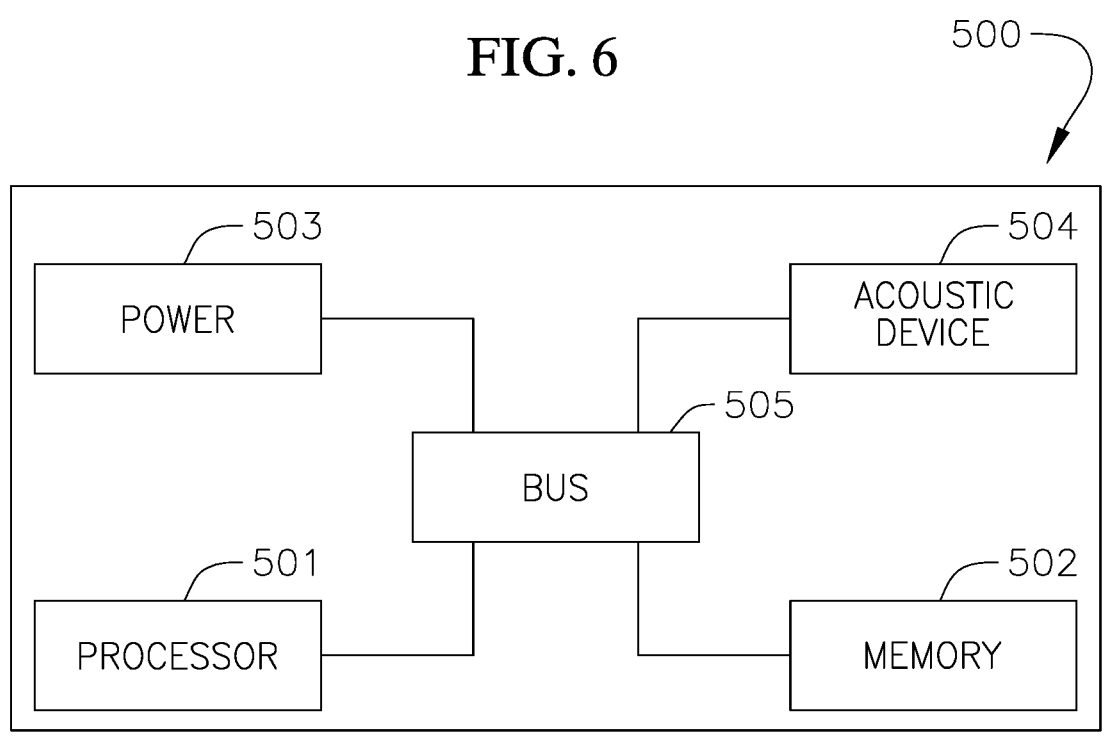
FIG. 6 is a schematic block diagram of a decoy module according to one embodiment of the present disclosure.

FIG. 6 is a schematic block diagram of the decoy module 500 according to one embodiment of the present disclosure. In one or more embodiments, the decoy module 500 is configured to enable the modular underwater vehicle 100 to follow a preset path at a preset depth and speed and to match the acoustic signature of the launching vehicle and thereby aid the evasion and escape of the launching vehicle. In the illustrated embodiment, the decoy module 500 includes at least one processor 501 (e.g., a system-on-chip (SOC) architecture and/or a multi-core CPU), at least one nonvolatile memory device 502 (e.g., a solid-state storage device), at least one power supply 503 (e.g., at least one battery), at least one acoustic device 504 (e.g., hydrophones mounted to the hull 101 and/or a towed array of hydrophones), and a system bus 505 over which the processor 501, the memory device 502, the power supply 503, and the acoustic device 504 with each other. In one or more embodiments, when the decoy module 500 is installed (e.g., as the second module 105 of the hull 101), the modular underwater vehicle 100 is initially neutrally buoyant in seawater (i.e., neutrally buoyant at the beginning of the run) and the modular underwater vehicle 100 is negatively buoyant in seawater at the end-of-run such that the modular underwater vehicle 100 with the decoy module 500 installed is configured to sink at the end-of-run.

In one or more embodiments, the nonvolatile memory device 502 of the decoy module 500 includes instructions stored therein which, when executed by the processor 501, cause the acoustic device 504 to emit sound matching or substantially matching the acoustic signature of the launch vehicle from which the modular underwater vehicle 100 was launched, such as a submarine or a ship.

In the illustrated embodiment, the nonvolatile memory device 502 has instructions stored therein which, when executed by the processor 501, drive the second stage rotor 115 of the propulsor 102 and actuate one or more of the control surfaces 103 such that the modular underwater vehicle 100 follows a preset path at a preset depth and speed to simulate the path, depth, and speed of the launch vehicle from which the modular underwater vehicle 100 was launched (e.g., the decoy module is configured to enable the modular underwater vehicle 100 to follow a path at a depth and speed that is consistent with the performance characteristics of the launching vehicle from which the modular underwater vehicle 100 was launched).

By emitting sounds matching the acoustic signature of the launch vehicle and following a preset path at a preset depth and speed that simulates the path, depth, and speed of the launching vehicle, the modular underwater vehicle 100 equipped with the decoy module 500 is configured to simulate the characteristics of the launch vessel and thereby draw the combatant vessel away from the launching vessel. In this manner, the modular underwater vehicle 100 equipped with the decoy module 500 is configured to aid the launching vehicle in evading and escaping a combatant vessel. In one or more embodiments, the preset path, depth, and speed of the modular underwater vehicle 100 during the escape and evade operation may be programmed into the nonvolatile memory device by connecting to an external waterproof electrical connector 506 in the hull 101 (e.g., in the outer skin 138 of the second module 105) that is electrically coupled to the memory device 502.

With continued reference to the embodiment illustrated in FIGS. 1A-1E and 1G, the third, intermediate module 106 of the hull 101 includes an outer shell or skin 140, a series of rails 141 coupled to an interior surface of the skin 140, and a power supply 142 (e.g., one or more batteries) coupled to the rails 141. In one or more embodiments, the rails 141 extend longitudinally along the third, intermediate module 106. In the illustrated embodiment, the rails 141 include upper and lower rails extending along the vertical axis (e.g., the buttline) and port and starboard rails extending along the horizontal axis (e.g., the waterline). Accordingly, in the illustrated embodiment, the rails 141 in the third module 106 are aligned or substantially aligned with the rails 139 and 131 in the second module 105 and the first module 104, respectively. In one or more embodiments, the third module 106 may have any other suitable number of rails 141 and the rails 141 may be arranged in any other suitable orientation.

With reference again to the embodiment illustrated in FIGS. 1A-1E and 1G, the aftmost module 107 of the hull 101 includes an outer shell or skin 143, a series of rails 144 coupled to an interior surface of the skin 143, and various electronic components (described in detail below) coupled to the rails 144. In one or more embodiments, the rails 144 extend longitudinally along the aftmost module 107. In the illustrated embodiment, the rails 144 include upper and lower rails extending along the vertical axis (e.g., the buttline) and port and starboard rails extending along the horizontal axis (e.g., the waterline). Accordingly, in the illustrated embodiment, the rails 144 in the aftmost module 107 are aligned or substantially aligned with the rails 141, 139, and 131 in the third module 106, the second module 105, and the first module 104, respectively. In one or more embodiments, the aftmost module 107 may have any other suitable number of rails 144 and the rails 144 may be arranged in any other suitable orientation.

Figure 7:
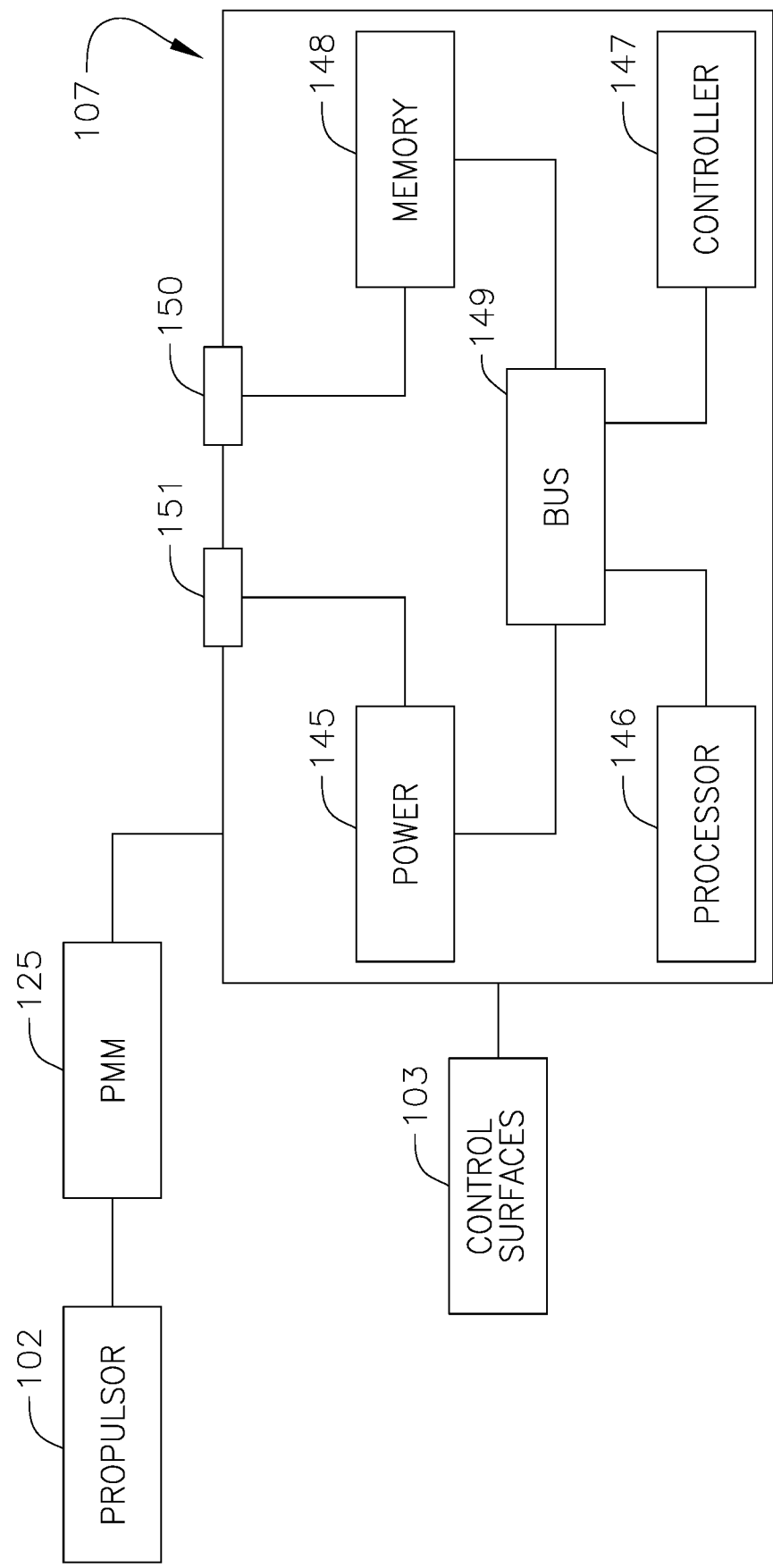
FIG. 7 is a schematic block diagram of a fourth module of the hull of the embodiment of the modular underwater vehicle illustrated in FIGS. 1A-1G according to one embodiment of the present disclosure.

FIG. 7 is a schematic block diagram of the aftmost module 107 according to one embodiment of the present disclosure. The aftmost module 107 of the hull 101 houses components for driving permanent magnet motor (PMM) 125 (which drives the second stage rotor 115 of the propulsor 102) to propel the modular underwater vehicle 100, and actuating the control surfaces 103 to navigate the modular underwater vehicle 100. For instance, in one or more embodiments, the aftmost module 107 of the hull 101 includes one or more power supplies 145 (e.g., one or more batteries) for powering the permanent magnet motor (PMM) 125 (which drives the second stage rotor 107 of the propulsor 102) and actuating the control surfaces 103. Additionally, in one or more embodiments, the aftmost module 107 includes a processor 146, a controller 147 (e.g., an electronic control unit (ECU)), and a nonvolatile memory device 148 (e.g., a solid-state memory device) storing computer-readable instructions which, when executed by the processor 146, cause the controller 147 to supply power from the one or more power supplies 145 to the permanent magnet motor (PMM) 125 (which drives the second stage rotor 115 of the propulsor 102) and to one or more of the control surfaces 103 to achieve the desired speed, depth, and heading of the modular underwater vehicle 100. In one or more embodiments, the one or more power supplies 145, the processor 146, the controller 147, and the memory device 148 may communicate with each other over a system bus 149. In one or more embodiments in which the exercise module 300 or the target module 400 is installed, the instructions stored in the memory device 148 may be configured to cause the controller 147 to supply power from the one or more power supplies 145 to the permanent magnet motor (PMM) 125 (which drives the second stage rotor 115 of the propulsor 102) and to one or more of the control surfaces 103 such that the modular underwater vehicle 100 follows a preset course at a preset speed and depth. In one or more embodiments, the instructions stored in the memory device 148 may be modified by via a waterproof electrical connector 150. Additionally, in one or more embodiments, the power supply 145 (e.g., one or more batteries) may be recharged via a waterproof electrical connector 151, which may be the same as or separate from the electrical connector 150. In one or more embodiments, the processor 146 is configured to receive data from one or more of the sensors (e.g., one or more sonars, hydrophones, and/or GPS antennae) in the modules 104-107. For instance, in one or more embodiments in which the warhead module 200 is installed, the processor 146 may be configured to receive the output of the artificial neural network and, based upon the data, drive the permanent magnet motor (PMM) 125 (which drives the propulsor 102) and one or more of the control surfaces 103 such that the modular underwater vehicle 100 attacks a target vessel.

Although the power supplies have been described above with reference to particular modules 104-107, in one or more embodiments, the one or more power supplies (e.g., the one or more batteries) may be housed in any of the modules 104-107. For instance, in one or more embodiments, the one or more power supplies may be housed in the first module 104, the second module 105, the third module 106, and/or the fourth module 107 (e.g., the one or more batteries may be coupled to one or more of the rails inside the first module 104, the second module 105, the third module 106, and/or the fourth module 107).

Additionally, although the one or more external waterproof electrical connectors have been described above with reference to particular modules 104-107, in one or more embodiments, the one or more external waterproof electrical connectors may be connected to any of the modules 104-107. The one or more external waterproof electrical connectors are configured to enable firing point/launch data to be transmitted from a launching platform fire control system (e.g., a rotary or fixed-wing aircraft, a surface ship or craft, or a submergible vehicle) to the modular underwater vehicle 100 prior to launch of the modular underwater vehicle 100 (i.e., the one or more external waterproof electrical connectors are configured to enable reprogramming of the modular underwater vehicle 100 while it is stored). The one or more waterproof electrical connectors are also configured to enable recharging of the one or more batteries inside the hull 101, for example, while the modular underwater vehicle 100 is stored in a launch system, a torpedo tube, or in a torpedo room or depot. Furthermore, the one or more external waterproof electrical connectors in the hull 101 enable the final test and checkout of the modular underwater vehicle 100 to be performed electronically, rather than with proofing runs, as is required by conventional torpedoes.

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention. Additionally, although relative terms such as "horizontal," "vertical," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" or "coupled to" another component, it can be directly on or attached to the other component or intervening components may be present therebetween.

What is claimed is:

1. A modular underwater vehicle comprising:
   a hull comprising a plurality of modular sections arranged along a lengthwise direction extending from a bow portion of the hull toward a stern portion of the hull, the hull defining an interior housing;
   a propulsor coupled to a stern of the hull;
   a plurality of control surfaces coupled to the propulsor or the stern of the hull; and
   a power supply, a processor, and a nonvolatile memory device in the interior housing,
   wherein the nonvolatile memory device has instructions stored therein which, when executed by the processor, cause the processor to supply power from the power supply to drive the propulsor and to actuate the plurality of control surfaces,
   wherein a transverse cross-sectional shape of the hull changes along a length thereof, and the bow portion has an ellipsoidal shape and the stern portion has a paraboloidal shape,
   wherein the propulsor and the plurality of control surfaces are coupled to and arranged aft of an aft-most modular section of the plurality of modular sections,
   wherein at least one modular section of the plurality of modular sections is detachable and removable from the hull so as to be replaceable with one or more other modular sections, and
   wherein the at least one modular section comprises at least one module selectable from:
   a warhead module configured to search for, target and attack a vessel;
   an exercise module configured to enable the modular underwater vehicle to perform tests;
   a target simulator module configured to emit a sound imitating an acoustic signature of a target vessel; and
   a decoy module configured to emit a sound imitating an acoustic signature of a launch vessel, and
   the at least one module is arranged aft of a forwardmost modular section of the plurality of modular sections.

2. The modular underwater vehicle of claim 1, wherein the plurality of control surfaces is arranged in an X-tail configuration.

3. The modular underwater vehicle of claim 2, wherein each of the plurality of control surfaces is oriented at approximately 45 degrees relative to a vertical axis or a horizontal axis of the modular underwater vehicle.

4. The modular underwater vehicle of claim 1, wherein each of the plurality of control surfaces is configured to be independently directly actuated.

5. The modular underwater vehicle of claim 1, wherein a cross-sectional shape of the hull varies continuously across an entire length of the hull.

6. The modular underwater vehicle of claim 1, wherein the propulsor is a three-stage propulsor.

7. The modular underwater vehicle of claim 6, wherein the three-stage propulsor comprises a first stage stator, a second stage rotor, and a third stage stator.

8. The modular underwater vehicle of claim 7, wherein the propulsor further comprises a permanent magnet motor configured to drive the second stage rotor.

9. The modular underwater vehicle of claim 8, further comprising a fairing surrounding the three-stage propulsor.

10. The modular underwater vehicle of claim 9, wherein a stator of the permanent magnet motor is in the fairing, and wherein a rotor of the permanent magnet motor is in the second stage rotor.

11. The modular underwater vehicle of claim 1, wherein the hull comprises an anechoic material.

12. The modular underwater vehicle of claim 1, wherein a length of the hull is approximately 10 feet or less, and wherein a maximum width of the hull is approximately 19 inches or less.

13. The modular underwater vehicle of claim 1, wherein a length of the hull is approximately 20 feet or less, and wherein a maximum width of the hull is approximately 21 inches or less.

14. The modular underwater vehicle of claim 1, wherein, when the at least one module is the warhead module, the modular underwater vehicle is neutrally buoyant in seawater.

15. The modular underwater vehicle of claim 1, wherein, when the at least one module is the exercise module or the target simulator module, the modular underwater vehicle is configured to be initially neutrally buoyant in seawater and positively buoyant in seawater at end-of-run.

16. The modular underwater vehicle of claim 1, wherein, when the at least one module is the decoy module, the modular underwater vehicle is configured to be initially neutrally buoyant in seawater and negatively buoyant in seawater at end-of-run.

17. The modular underwater vehicle of claim 1, wherein the warhead module comprises a navigation system configured to enable autonomous tracking of a target submarine.

18. The modular underwater vehicle of claim 17, wherein the navigation system comprises at least one sonar, an inertia measurement unit (IMU), a Global Positioning System (GPS) receiver including a Selective Availability Anti-Spoofing Module (SAASM), and an artificial neural network trained to classify objects in a maritime environment.

19. The modular underwater vehicle of claim 1, further comprising a waterproof electrical connector in the hull configured to enable electronic testing of the modular underwater vehicle.

20. A modular underwater vehicle system comprising:
a modular underwater vehicle comprising:
   a hull comprising a plurality of modular sections, the hull defining an interior housing;
   a propulsor coupled to a stern of the hull;
   a plurality of control surfaces coupled to the propulsor or the stern of the hull; and
   a power supply, a processor, and nonvolatile memory device in the interior housing, wherein the nonvolatile memory device has instructions stored therein which, when executed by the processor, cause the processor to supply power from the power supply to drive the propulsor and to actuate the plurality of control surfaces,
   wherein the propulsor and the plurality of control surfaces are coupled to and arranged aft of an aft-most modular section of the plurality of modular sections; and
a warhead module configured to be installed as one of the plurality of modular sections of the hull, the warhead module configured to enable the modular underwater vehicle to target and attack a vessel;
an exercise module configured to be installed as one of the plurality of modular sections of the hull, the exercise module configured to enable the modular underwater vehicle to perform tests;
a target simulator module configured to be installed as one of the plurality of modular sections of the hull, the target simulator module configured to emit sound imitating an acoustic signature of a target vessel; and
a decoy module configured to be installed as one of the plurality of modular sections of the hull, the decoy module configured to emit a sound imitating an acoustic signature of a launch vessel,
wherein at least one of the warhead module, the exercise module, the target simulator module, or the decoy module is arranged aft of a forwardmost modular section of the plurality of modular sections.

21. The modular underwater vehicle system of claim 20, wherein the warhead module comprises:
   an insensitive high explosive shaped-charge warhead; and
   a navigation system configured to enable autonomous tracking of a target submarine, the navigation system comprising:
      at least one sonar;
      an inertia measurement unit (IMU);
      a Global Positioning System (GPS) receiver including a Selective Availability Anti-Spoofing Module (SAASM); and
      an artificial neural network trained to classify objects in a maritime environment.

22. The modular underwater vehicle system of claim 21, wherein, when the warhead module is installed on the modular underwater vehicle, the modular underwater vehicle is neutrally buoyant in seawater.

23. The modular underwater vehicle system of claim 20, wherein the exercise module comprises:
   a data recorder configured to record vehicle data and a simulated warhead detonation; and
   at least one of a location pinger and a visual beacon.

24. The modular underwater vehicle system of claim 20, wherein the target simulator module comprises:
   at least one acoustic device;
   a processor;
   a nonvolatile memory device; and
   at least one of a location pinger and a visual beacon,
   wherein the nonvolatile memory device includes instructions stored therein which, when executed by the processor, cause the at least one acoustic device to emit the sound imitating the acoustic signature of the target vessel.

25. The modular underwater vehicle system of claim 20, wherein the decoy module comprises:
   at least one acoustic device;
   a processor; and
   a nonvolatile memory device,
   wherein the nonvolatile memory device includes instructions stored therein which, when executed by the processor, cause the at least one acoustic device to emit the sound imitating the acoustic signature of the launch vessel.

* * * * *